Dec. 10, 1940.    Y. SEKELLA    2,224,525
ENGINE STARTER DRIVE
Filed Feb. 3, 1938    3 Sheets-Sheet 2
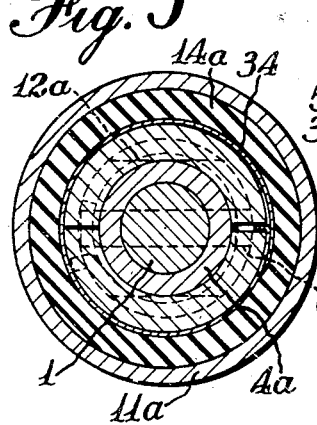
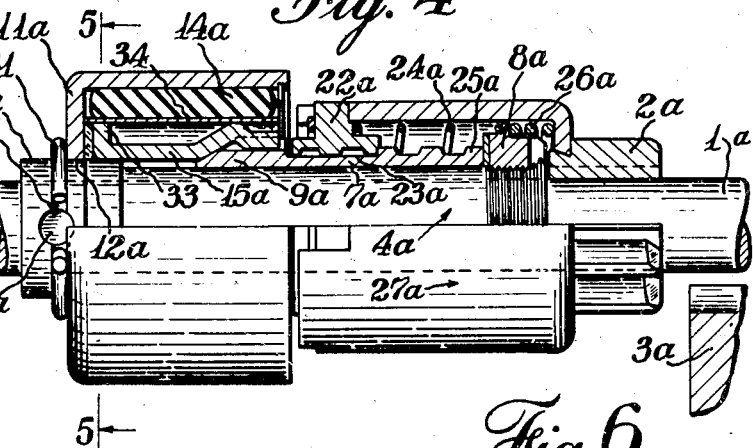
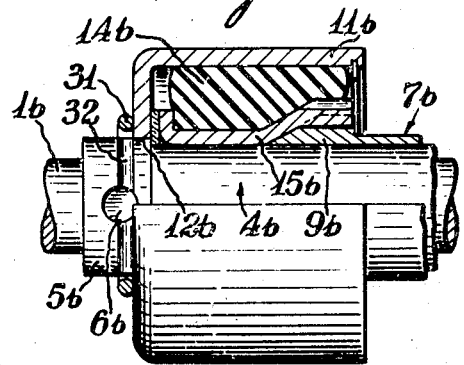
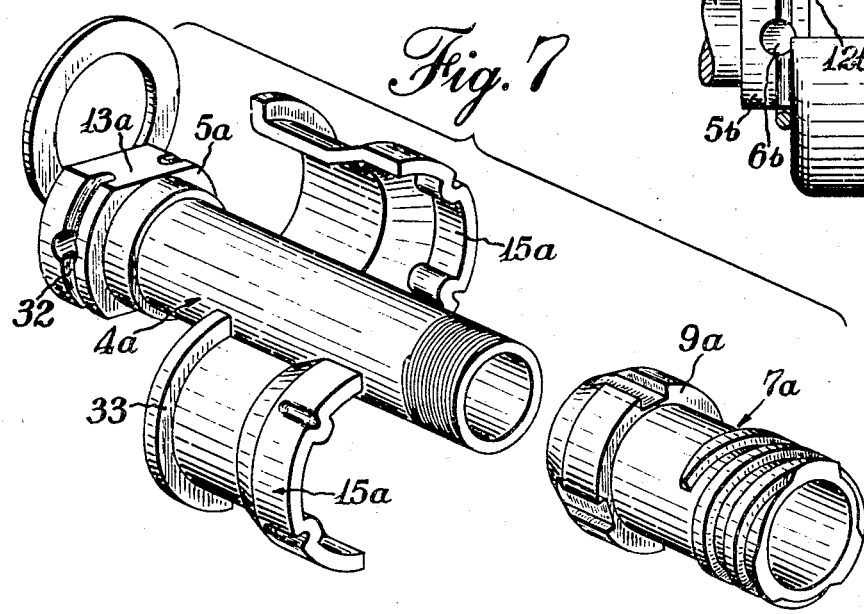
Witness:
Burr W. Jones
INVENTOR.
Youston Sekella
BY Clinton L. James
ATTORNEY.

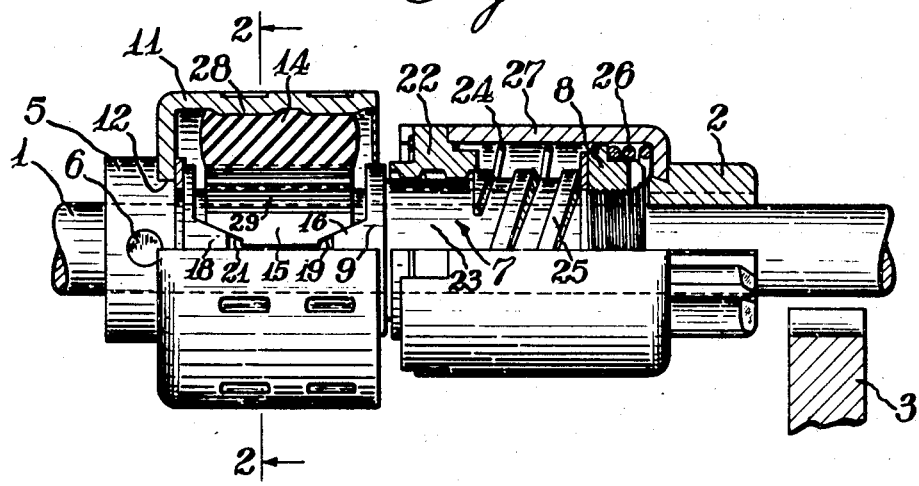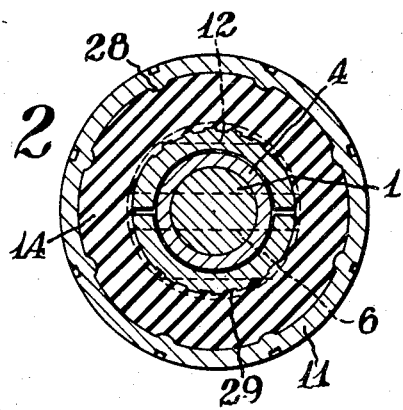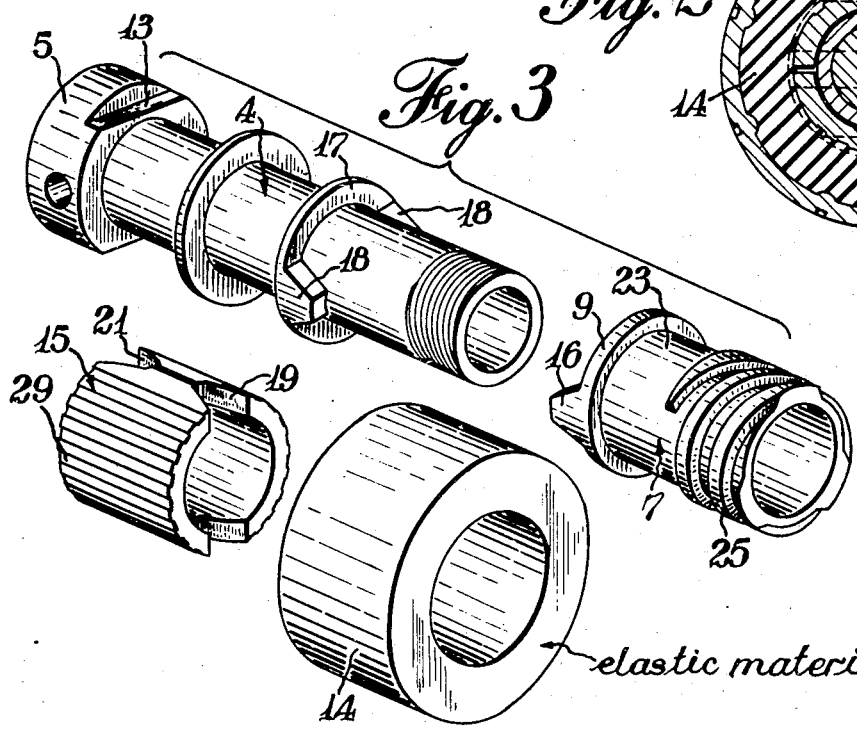

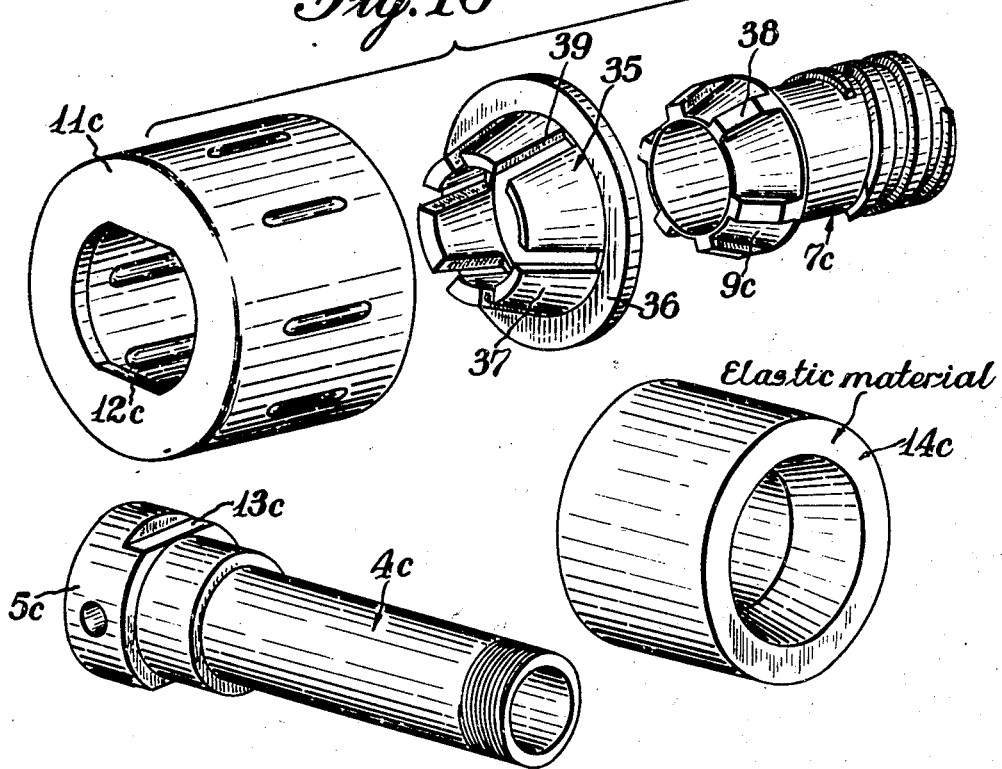

Patented Dec. 10, 1940

2,224,525

UNITED STATES PATENT OFFICE 2,224,525

ENGINE STARTER DRIVE

Youston Sekella, Elmira, N. Y., assignor, by mesne assignments, to Bendix Aviation Corporation, South Bend, Ind., a corporation of Delaware Application February 3, 1938, Serial No. 188,527

9 Claims. (Cl. 74—7)

The present invention relates to engine starter drives and more particularly to a yielding driving connection for engine starters.

It is an object of the present invention to provide a starter drive incorporating a novel form of self-adjusting yielding driving connection.

It is another object to provide such a device in which the yielding driving connection is automatically self-tightening.

It is another object to provide such a device in which the tightening action may readily be adapted for various types of yielding coupling means.

It is a further object to provide such a device in which the yielding coupling means comprises a body of elastically deformable material such as rubber.

It is a further object to provide such a device in which the yielding coupling member is in the form of a sleeve, and the control of the coupling is obtained by wedging outwardly portions of said sleeve.

It is another object to provide such a device in which the yielding coupling member is protected from attrition by the expansive members therefor.

Further objects and advantages will be apparent from the following description taken in connection with the accompanying drawings in which:

Fig. 1 is a side elevation partly in section of a preferred embodiment of the invention;

Fig. 2 is a section taken substantially on the line 2—2 of Fig. 1;

Fig. 3 is a perspective detail of certain of the elements of the yielding driving connection illustrated in Fig. 1, shown in disassembled relation;

Fig. 4 is a view similar to Fig. 1 showing a second embodiment of the invention;

Fig. 5 is a section taken substantially on the line 5—5 of Fig. 4;

Fig. 6 is a detail partly in section showing a modified form of the embodiment illustrated in Fig. 4;

Fig. 7 is a detail view in perspective of certain of the parts illustrated in Fig. 6, shown in disassembled relation;

Fig. 8 is a view similar to Fig. 1, showing a third embodiment of the invention;

Fig. 9 is an end view thereof; and

Fig. 10 is a perspective detail of certain of the parts illustrated in Fig. 8, shown in disassembled relation.

In Fig. 1 of the drawings, there is illustrated a power shaft 1 which may be the extended armature shaft of the starting motor, not illustrated, carrying a driving member in the form of a pinion 2 slidably and rotatably mounted thereon for movement into and out of engagement with a member such as a flywheel gear 3 of an engine to be started.

Means for actuating the pinion 2 from shaft 1 is provided including a hollow shaft 4 (Fig. 3) having a driving head 5, non-rotatably mounted on shaft 1 as by means of a pin 6 traversing the driving head and the shaft.

A screw shaft 7 is loosely mounted on the hollow shaft 4, being retained thereon by a stop nut 8 threaded on the end of the shaft 4. Screw shaft 7 is provided with a driven head 9, and means are provided for rotating the driven head from the driving head 5 comprising a barrel member 11 non-rotatably connected to the driving head 5 as by means of a non-circular opening 12 in the barrel fitting a projection 13 of "double-D" section on the driving head. A cylindrical block 14 of elastically deformable material such as rubber is mounted in the barrel 11, and a split sleeve 15 is mounted within the member 14 in frictional engagement therewith and non-rotatably connected to the driven head 9.

Means for expanding the split sleeve 15 to compress the member 14 in the barrel and thereby build up the torque capacity of the driving connection between the barrel and driven head, is provided in the form of cam projections 16 on the driven head and a complementary expanding member 17 having cam projections 18, which cam projections 16 and 18 are adapted to enter tapered slots 19 and 21 respectively in the ends of the split sleeve member 15 whereby longitudinal motion of the screw shaft 7 to the left in Fig. 1 causes the cam projections 16 and 18 to expand the split sleeve 15 and compress the rubber block 14.

Means for actuating the pinion 2 from the screw shaft 7 are provided in the form of a nut 22 normally maintained on a smooth portion 23 of the screw shaft 7 by an anti-drift spring 24, but caused to engage the threads 25 of the screw shaft by a reentry spring 26. Motion of the nut 22 is transmitted to the pinion 2 by means of a barrel 27 rigidly connected therewith.

In the operation of this embodiment of the invention, rotation of the shaft 1 is transmitted through the driving head 5, barrel 11 and rubber block 14 to the split sleeve 15, and from thence by means of the projections 16 to the screw shaft 7. It will be understood that the stop nut 8 so positions the screw shaft that the rubber block 14 is maintained under some initial compression.

Rotation of the screw shaft causes longitudinal motion of the nut 22 thereon until said nut engages the stop nut 8, whereby the pinion 2 is moved into engagement with the engine gear 3. Further rotation of the drive shaft 1 transmitted to the screw shaft 7 causes it to thread itself backward to the left in Fig. 1, causing the split sleeve 15 to be expanded by the projections 16 and 18, thus compressing the rubber block until sufficient torque is built up to cause the pinion 2 to rotate the engine gear 3.

When the engine starts, the acceleration of the engine gear causes the pinion 2 and its associated parts to overrun the drive shaft, whereupon the parts are returned to their idle positions.

It may be deemed desirable to increase the adhesion of the rubber block to the barrel and split sleeve 15 by roughening the surfaces thereof or providing longitudinal projections or grooves as indicated at 28 and 29.

In the embodiment of the invention illustrated in Figs. 4 and 5, the structure is substantially similar to the embodiment illustrated in Figs. 1 to 3, but the driving barrel 11a is made removable from the driving head 5a without dismounting the drive by the use of a split ring 31 to retain the barrel, mounted in a groove 32 in the drive head.

In this case, the split sleeve 15a is arranged to be expanded by a tapered head 9a on the screw shaft 7a. The sleeve members are formed with end abutment flanges 33 engaging the end of the barrel 11a, and an expansible bushing 34 of elastic sheet material is arranged to enclose the split sleeve within the rubber coupling block 14a so as to present a continuous cylindrical surface to the interior of said coupling member.

The remainder of the structure illustrated in Figs. 4 and 5 is the same as that illustrated in Figs. 1 and 2, and the operation of the device is substantially similar.

In Figs. 6 and 7 a modification of the structure illustrated in Figs. 4 and 5 is shown in which the split sleeve 15b is arranged to cooperate directly with the interior of the rubber coupling member 14b without the interposition of the expansible sleeve 34 illustrated in Figs. 4 and 5. The remaining structure is the same as illustrated in Figs. 4 and 5.

In Figs. 8, 9 and 10 a third embodiment of the invention is illustrated in which the compressive force applied to the rubber coupling block is both radial and longitudinal, and is applied at one end only.

In this structure the screw shaft 7c is formed with a tapered head 9c adapted to cooperate with a thrust member 35 having a radial flange 36 fitting in the end of the barrel 11c and an inwardly tapered portion 37 non-rotatably connected with the tapered end 9c of the screw shaft 7c as by means of radial projections 38 on said tapered end extending into slots 39 formed in the tapered portion 37 of the thrust member.

Longitudinal motion of the screw shaft 7c to the left in Fig. 8 due to the screw jack action of the screw shaft and nut 22c causes the thrust member 35 to compress the rubber block 14c both radially and longitudinally until the torque builds up sufficiently to cause the pinion 2c to rotate the engine gear 3c.

The rubber block 14c is preferably molded with an irregular cross section as illustrated in Fig. 8, so as to leave room within the barrel for distortion to take place under the compressive action of the member 35, whereby the desired elastic yielding properties of the coupling may be secured.

Although certain embodiments of the invention have been shown and described in detail, it will be understood that other embodiments are possible and that various changes may be made in the design and proportions of the parts without departing from the spirit of the invention as defined in the claims appended hereto.

What is claimed is:

1. In an engine starter drive, a power shaft, a pinion movable thereon into and out of mesh with a gear of the engine to be started, and means for actuating the pinion from the shaft including a driving member in the form of a hollow cylinder, a coupling member therein in the form of a cylindrical body of elastically deformable material, and load actuated means for wedging said body outward into frictional engagement with the interior of the driving member.

2. In an engine starter drive, a power shaft, a pinion movable thereon into and out of mesh with a gear of the engine to be started, and means for actuating the pinion from the shaft including a barrel member, a cylindrical body of elastically deformable material therein, and torque responsive means for wedging a portion of said body outward into frictional engagement with the interior of the barrel.

3. In an engine starter drive, a power shaft, a driving member movable into and out of engagement with a member of an engine to be started, and means for actuating the driving member from the shaft including a hollow cylinder of elastically deformable material, driving and driven transmission means frictionally engaging the interior and exterior of said cylinder, and means for moving one of said transmission means radially to compress the cylinder between said transmission means.

4. In an engine starter drive, a power shaft, a driving member movable into and out of engagement with a member of an engine to be started, and means for actuating the driving member from the shaft including a hollow cylinder of deformable material having a high coefficient of friction, driving and driven transmission means frictionally engaging the interior and exterior of said cylinder, and means responsive to the torque transmitted thereby for moving one of said transmission means radially to compress the cylinder between said transmission means.

5. In an engine starter drive, a power shaft, a driving member movable into and out of engagement with a member of an engine to be started, and means for actuating the driving member from the shaft including a hollow cylinder of elastically deformable material having a high coefficient of friction, inner and outer cylindrical transmission members frictionally engaging the interior and exterior of the elastic cylinder respectively, the inner cylinder being longitudinally slotted, and means operated by the torque transmitted therethrough for moving the inner cylinder to expand the interior of the elastic cylinder.

6. In an engine starter drive, a power shaft, a pinion movable thereon into and out of mesh with a gear of an engine to be started, means actuated by the power shaft for moving the pinion into operative position and rotating it to crank the engine including a hollow cylindrical body of elastically deformable material, driving and driven transmision means frictionally engaging the interior and exterior of said body, a slidable shaft having a screw-threaded connection to the pinion for traversing and rotating the pinion, and means whereby the thrust of the screw shaft caused by the torque transmitted thereby to the pinion moves one of said transmission means radially to tighten the frictional engagement of the transmission means.

7. In an engine starter drive, a power shaft, a pinion movable thereon into and out of mesh with a gear of an engine to be started, means actuated by the power shaft for moving the pinion into operative position and rotating it to crank the engine including a hollow cylindrical body of elastically deformable material, transmission means frictionally engaging the interior and exterior of said body, and a slidable shaft having a screw-threaded connection to the pinion for traversing and rotating the pinion, and having a cam connection with the interior transmission means arranged to expand the interior of the elastic body responsive to torque transmitted therethrough.

8. In an engine starter drive, a power shaft, a member adapted to engage and drive a member of an engine to be started, and a yielding driving connection therebetween including a hollow cylindrical block of elastically deformable material, inner and outer transmission members frictionally engaging the interior and exterior of the block, said inner transmission member being longitudinally split, and torque-responsive means for expanding the split transmission member within the block.

9. In an engine starter drive, a power shaft, a member adapted to engage and drive a member of an engine to be started, and a yielding driving connection therebetween including a hollow cylindrical block of elastically deformable material, inner and outer transmission members frictionally engaging the interior and exterior of the block, a tapered expanding member arranged to enter one end of the block, and torque-responsive means for forcing said expanding member into the interior of the block.

YOUSTON SEKELLA.